Jan. 7, 1947.　　　R. J. HOWISON　　　2,413,829
STAMPED CHAIN CONNECTOR
Original Filed Nov. 30, 1942
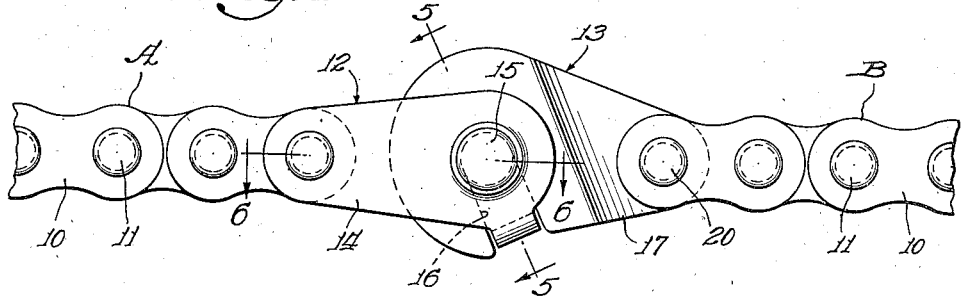
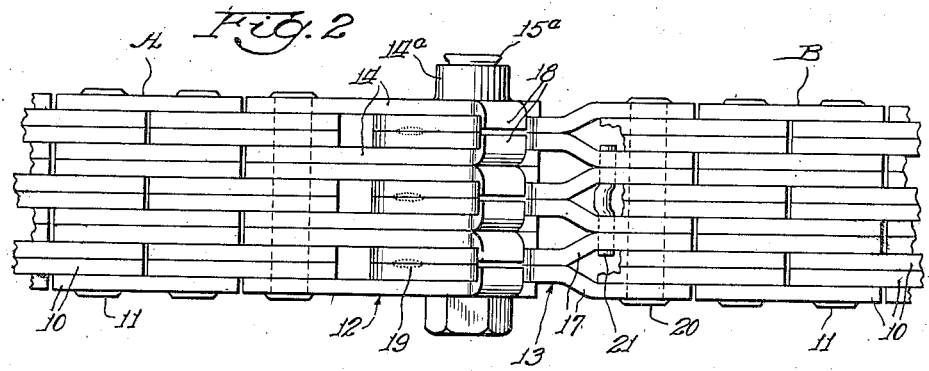
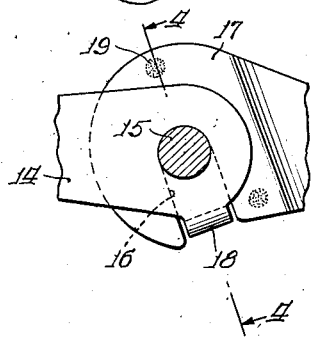
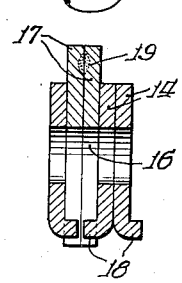
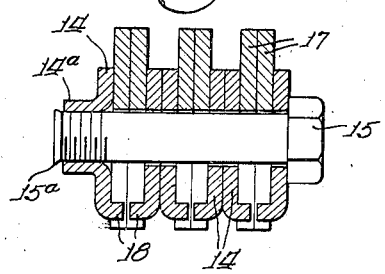
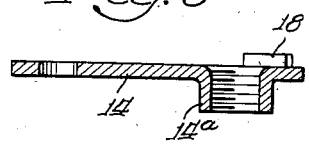
Inventor:
Robert J. Howison
By Edward C. Fritzbaugh
Atty.

Patented Jan. 7, 1947

2,413,829

UNITED STATES PATENT OFFICE 2,413,829

STAMPED CHAIN CONNECTOR

Robert J. Howison, Detroit, Mich., assignor to Morse Chain Company, Ithaca, N. Y., a corporation of New York Original application November 30, 1942, Serial No. 467,314. Divided and this application October 20, 1943, Serial No. 506,997

8 Claims. (Cl. 74—258)

The present invention relates primarily to connectors for chains and similar link structures. More specifically the improvements are directed to means for preventing articulation between the hook and yoke elements of a connector such as contemplated herein, and for providing a suitable engaging element for the threaded end of the clamping bolt of such connector.

This application is a division, insofar as the subject matter is common to both, of the co-pending prior application of Robert J. Howison for United States Letters Patent for a "Stamped chain connector" which was filed November 30, 1942, Serial No. 467,314. As pointed out in said application, this device is useful and desirable for connecting sections of an industrial chain drive, or the ends of chain segments that are used to carry the shoes on an endless tread for traction vehicles, and for other purposes.

One of the principal objects of this invention is to simplify the construction of a chain connector such as contemplated herein, and to improve the efficiency and operation of such connector.

It is also one of the principal objects of this invention to provide a connector embodying yoke and hook members of a laminated construction and made of sheet metal blanks or stampings.

Another object hereof is to provide yoke and hook connector members that may be readily joined or disconnected by a single operation and the tightening or loosening of a bolt, and also to provide means for preventing substantial articulation or relative movement of the hook and yoke with respect to each other whereby to reduce wear on the assembled parts.

A further object is to provide a connector in which the threaded end of the tightening bolt is engaged in a threaded stub or boss that is formed integral with the yoke and, after the bolt has been screwed into such stub or boss, the end of the bolt is enlarged to prevent its accidental dislodgment from the connector. In this connection, the engagement of the bolt directly with a portion of the metal forming the yoke provides a less expensive structure than where a separate nut is employed for the bolt and it also reduces the amount of material as well as the weight of the connector. Furthermore, the stub or boss is an up-struck element that is formed during the forming of a yoke blank. The length of the threaded portion of this stub exceeds the thickness of the material of the yoke blank, thus affording a greater length of thread contact than if the threads were made only in a hole in the metal blank, and it is not subject to stripping. By forming the bolt-receiving stub or boss as an integral part of the yoke blank it is the same quality or grade of material as the blank itself which is superior to the material of the usual screw-machine nut. Since the stub or boss will be accurately positioned during the fabrication of the yoke blank, the question of alignment will not arise in making the connection when assembling the parts of the chain and connector device.

Additional objects, aims, and advantages of the present invention will be apparent to persons skilled in the art after the construction and operation of the improved connector is understood from the within description.

It is preferred to accomplish the numerous objects of this invention and to practice the same in substantially the manner hereinafter fully described and as more particularly pointed out in the appended claims, reference being made to the accompanying drawing that form a part of this specification, wherein:

Fig. 1 is a side elevation showing the connector device contemplated herein assembled with the end sections or links of a laminated type chain;

Fig. 2 is a bottom plan of the structure shown in Fig. 1;

Fig. 3 is a fragmentary side elevation showing the assembled connector upon the link bolt and disclosing details of the means for preventing articulation between the yoke and hook;

Fig. 4 is a transverse sectional view showing several hook and yoke assemblies in connected positions, the view being taken on the plane of line 4—4 of Fig. 3 and looking in the direction of the arrows, the bolt being omitted;

Fig. 5 is a transverse sectional view on the plane of line 5—5 of Fig. 1 looking in the direction of the arrows and showing the formation of the bolt-receiving stub or boss on the outer yoke blank; and Fig. 6 is a longitudinal section of a yoke blank, the view being on the plane of line 6—6 of Fig. 1.

The drawing is to be understood as being more or less of a schematic character for the purpose of disclosing a typical or preferred form of the improvements or novel features contemplated herein, and in the drawing like reference characters identify the same parts in the several views.

Referring primarily to Figs. 1 and 2, the end sections A and B of a chain or chains comprise links 10 that are stamped out of sheet metal or other suitable material and they are disposed in pairs that overlap each other in the manner shown with the usual pivot pins 11 passed transversely through their proximate portions to permit ready articulation or relative hinging movement of the links with respect to each other. The connector that joins the chain ends comprises a yoke element and a hook element that are designated in their entirety by the numerals 12 and 13 respectively. The yoke and hook blanks are of lobe or pear-shape in outline, and they are disposed with their apical or narrower ends hingedly mounted on the pivot pins 11 at the terminals of the chain ends.

The yoke 12 comprises a plurality of blanks 14, formed of sheet metal stampings or the like, and these blanks 14 of the yoke are preferably spaced apart either singly or in pairs. The preferable arrangement as illustrated in Fig. 2 discloses the outer blanks of the yoke 12 as comprising a single blank of material in each instance, and spaced therefrom at intervals are double blanks. This arrangement especially adapts itself to the inclusion of the yoke in a chain formed of links of generally similar material. The blanks 14 of the yoke 12 are spaced apart, as illustrated in Fig. 2, by the links 10 of the chain end portion A. The yoke blanks 14, preferably at the time of forming or shaping, have a hole punched therein to receive a clamping means such as tightening bolt 15. This bolt 15 extends through the blanks 14 and connects a plurality of such blanks together in spaced relation, thus forming the yoke 12 into an integral element or unit. The bolt receives and seats the eyes or recesses 16 of the blanks 17 forming the hook element 13, the said blanks being preferably spaced for insertion into the spaces between the blanks of the yoke element 12.

The yoke blanks 14 are provided with articulation preventing means such as the ear 18 which is preferably of rectangular shape and generally corresponds to the width or transverse dimension of the eye or recess 16 of the hook. The ear 18, which is preferably formed of the same piece of sheet metal as the blank 14 of the yoke 12, is integral therewith, and it is bent lateral so as to enter the open end portion of the eye or recess 16 of the hook 13. When the blanks of material 14 are spot-welded or placed together as is shown in Fig. 4, the respective ears will be bent outward or apart to a position in which they will engage the eye of each hook blank as shown. The main purpose of the ear 18 is to prevent the hook 13 from moving with respect to the yoke 12, when the device is in an assembled or connected position. In this manner, articulation is effectively prevented in the connector, and the undue wear, which would take place if there were relative movement between the yoke and hook, is entirely eliminated in the present connector.

One of the outer blanks 14 of the yoke member is provided with a stub or boss 14a that surrounds the bolt-receiving hole in such blank. The interior of this stub is threaded to receive the threaded end portion of the clamping or tightening bolt 15 that is screwed therein when the yoke blanks have been assembled. The stub or boss 14a is preferably an upstruck portion of the metal blank and it is formed thereon during the operation of stamping or forming this outer yoke blank. It will be seen that the length of the stub or boss 14a exceeds the thickness or gauge of the sheet metal material from which the yoke blank is formed. By reason of this particular arrangement it is possible to secure a greater length of threaded surface within said stub or boss than would be possible were the threads tapped directly in the edge of the hole in the metal blank. Thus liability of stripping the threads under heavy duty or pressure is avoided. Furthermore, the employment of an integral stub provides a bolt-receiving element that is formed of a material that is superior to the material of the usual screw-machine nut. Said stub is accurately positioned on the blank during the forming operation so that the alignment of the components of the yoke is definitely fixed for the operation of assembly thereof.

The bolt 15 has an end enlargement 15a, as indicated in Fig. 2 for the purpose of preventing the bolt becoming detached from the stub or boss 14a. This enlargement 15a may be formed by peening or upsetting the end of the bolt after it is inserted in the stub or boss 14a. Sufficient space is left between the enlarged end 15a of the bolt and the outer end of the stub 14a to allow loosening of the bolt so that the yoke and hook elements may be readily put together or taken apart. With this arrangement, the bolt 15 becomes a unitary part of the yoke element and will not become lost or accidentally displaced.

The hook element 13 is preferably composed of a plurality of blanks 17, and it is desirable to make the several blanks into a unitary structure. The blanks as shown, particularly in Figs. 2 and 4, are generally arranged in pairs. Each blank 17 of the hook element may be formed separately, but where they are arranged in pairs as shown in Fig. 2, the two blanks constituting a pair ordinarily should be attached by spot-welding as shown at 19. Several spot-welds may be provided, which in addition to attaching the blanks of a pair together, have the effect of increasing the roughing or convexing and concaving the surfaces of the blanks which are exposed to contact with the blanks forming the yoke 12. This concaving and convexing has the desirable effect of causing the parts to grip better upon a tightening of the bolt 15 and, what is possibly more important, produces a lock-washer action that prevents loosening of the bolt 15 in operation. Blanks made by stampings as herein referred to generally have at least minute distortions of their surfaces, thus making them particularly effective for use on the devices herein disclosed.

The blanks 17 of the hook 13, when assembled in pairs, are preferably bifurcated, as illustrated in Fig. 2. This distributes the load of the pull on the chains A and B, and provides the space for insertion of the attaching chain links 10, as shown in Fig. 2, so that the hook 13 and the chain B may be attached by means of the pin 20. The bifurcating also permits the insertion of a key 21 through a hole drilled or punched in the blanks 17 for that purpose. The key 21 thus inserted is preferably bent or distorted in its center as shown in Fig. 2 for the purpose of retaining it in position. This key locks the blanks 17 into a unitary construction so that they form the hook 13. The reason for the forming of the hook 13 in a single unitary part is that it is thus easily and readily handled in connecting and disconnecting the parts forming the connector.

Due to the slant of the eye 16, there is little or no danger of the hook 13 becoming disconnected as long as there is tension on the chain or device on which it is used, and thus, since there is little or no danger of losing the bolt 15 due to its enlarged end 15a, the device makes a very desirable connector for such use as connecting the ends of tank treads, or for forming a readily removable tread for dual wheel trucks, or the like.

In the operation of this device, the yoke 12 forms one end of a chain A and the hook 13 the end of a chain B or similar device, and the yoke and hook are connected by inserting the hook 13 into the spaces between the laminations of the yoke 12. The arrangement herein provided makes this a simple and quick matter, which is extremely important under conditions of operation in the field, it merely being necessary to relieve the tension slightly on the chains, and insert the eye or hook slot 16 of the hook over the bolt 15. The chains are then tightened, and the head of the bolt 15 is turned into a tightened position so as to lock the lamination together. The connector is then held against articulation and the bolt exerts thereon a lock-washer action which keeps it tight in operation. To release the device, it is merely necessary to release the tension on the connector, and then unscrew the bolt 15 so as to loosen the pressure between the laminations, after which the hook may be lifted off the yoke. The slant of the eye of each lamination on the hook, retains the device against unexpected release due to an unintentional loosening of the bolt 15.

While this invention has been described in detail in its present preferred form or embodiment, it will be apparent to persons skilled in the art, after understanding the improvement, that various changes and modifications may be made therein without departing from the spirit or scope thereof. It is aimed in the appended claims to cover all such changes and modifications.

I claim:

1. A laminated connector comprising yoke and hook mating parts, means releasably retaining said yoke and hook parts together, lug means integral with said yoke and comprising an ear formed of the material of said yoke and bent laterally with respect to the blanks forming said yoke, said ear engaging the eye of said hook means after said hook means has been positioned to engage said yoke means, and thereby retaining the yoke and hook means against relative movement, the device having means attaching said yoke and hook to chains or the like to be connected.

2. A device of the class described comprising in combination a yoke constructed of a plurality of sheet metal stampings formed into yoke blanks, a hook constructed of a plurality of sheet metal stampings formed into hook blanks and having hook eyes, means in connection with said yoke receiving and releasably retaining said hook in position to form a connector with said yoke, said receiving and retaining means comprising a bolt passing through the blanks forming the yoke, an integral stub up-struck from one of the yoke blanks, said stub having internal threads to receive the threaded end of said bolt, said bolt having its end portion beyond the stub enlarged after it is inserted in position, and means in connection with said yoke and hook retaining said yoke and hook against articulation.

3. A laminated connector for the ends of members to be connected, comprising mating elements, each element having a plurality of blanks arranged to mate with the other element one element having hook means and the other element having means engaging said hook means, said last mentioned engaging means being operable to releasably clamp said mated elements together, and means preventing substantial articulation of the mating elements comprising ears integral with the blanks forming the element mated with said hook means, said ears bent laterally to their respective blanks and entered in eyes of said hook means.

4. A laminated connector embodying yoke and hook elements, said elements each comprising a plurality of blanks arranged in the respective elements for coaction with the blanks of the other element, a bolt passed through the blanks of the yoke element and engaged by the eye of the hook element, said bolt operable to releasably clamp the hook and yoke elements together, and a threaded integral stub up-struck from an outer blank of said yoke element and into which the threaded end of said bolt is screwed.

5. A laminated connector embodying yoke and hook elements, said elements each comprising a plurality of blanks arranged in the respective elements for coaction with the blanks of the other element, integral ears bent lateral from the edges of said yoke blanks and engaged in the eyes of the hook blanks for retaining said yoke and hook elements against substantial articulation, a bolt passed through the yoke blanks and engaged by the eye of the hook element, and an integral stub up-struck from an outer blank of said yoke element, said stub having internal threads to receive the threaded end of said bolt to clamp together the blanks of the yoke and hook elements.

6. A laminated connector comprising a yoke and hook mating parts, means releasably retaining said yoke and hook parts together, said means including an integral up-struck portion from one of said yoke blanks and bolt means having means engaging and retaining said bolt means in position, and said yoke and hook mating parts having means substantially eliminating articulation therebetween.

7. As an article of manufacture, a blank for a yoke of a yoke and hook type laminated connector having a plurality of yoke and hook blanks with means attaching said blanks together, said yoke blank comprising a sheet of material in the shape of a blank, an integral stub portion up-struck from said material, said stub portion being internally threaded whereby said means attaching said blank to other elements of said connector is received and retained.

8. As an article of manufacture, a blank for a yoke of a yoke and hook type laminated connector comprising a metal stamping with an integral stub portion up-struck from said blank, said stub portion being internally threaded whereby means attaching said blank to other elements of said connector is received and retained, and said yoke blank having an ear portion formed integral with said blank and bent laterally with respect thereto.

ROBERT J. HOWISON.